United States Patent [19]

Neufeld

[11] 4,382,562
[45] May 10, 1983

[54] FINGER BRAKE FOR A SPINNING REEL AND METHOD OF ASSEMBLING SAME

[75] Inventor: Henry L. Neufeld, Tulsa, Okla.

[73] Assignee: Brunswick Corporation, Skokie, Ill.

[21] Appl. No.: 218,926

[22] Filed: Dec. 22, 1980

[51] Int. Cl.³ .............................................. A01K 89/01
[52] U.S. Cl. .................................. 242/84.2 A; 29/447
[58] Field of Search ................... 242/84.2 A, 84.21 A, 242/84.2 R; 74/558.5, 551.9

[56] References Cited

U.S. PATENT DOCUMENTS

| | | | |
|---|---|---|---|
| 2,520,808 | 8/1950 | Miller | 74/558.5 X |
| 2,705,336 | 4/1955 | Wilson | 74/558.5 X |
| 2,929,579 | 3/1960 | Hull | 242/84.2 A |
| 3,018,979 | 1/1962 | Clickner | 242/84.21 A |
| 3,085,766 | 4/1963 | Salmivuori | 242/84.21 A |
| 4,156,510 | 5/1979 | Hull | 242/84.2 R |

FOREIGN PATENT DOCUMENTS 822851 11/1959 United Kingdom .......... 242/84.2 A

*Primary Examiner*—Billy S. Taylor
*Attorney, Agent, or Firm*—John G. Heimovics

[57] ABSTRACT

A closed face spinning reel is suspended below a fishing rod. The reel has a finger brake lever that causes the spinner head to move from the winding position to the precasting and casting position by lifting up on the finger lever. The finger lever arm is made in two parts, one metal and the other molded plastic, which parts are assembled by inserting the metal part in the plastic part while the plastic part is warm from the mold so that the plastic shrinks around the metal. A resilient element in the plastic part cooperates with a mating surface on the body of the reel to hold the lever against a stop preventing rattling when the lever is not held and returning the lever to a uniform released position.

10 Claims, 5 Drawing Figures

FINGER BRAKE FOR A SPINNING REEL AND METHOD OF ASSEMBLING SAME

TECHNICAL FIELD

This application relates to a closed face spinning reel and more particularly to a finger brake for such a reel and to a method of assembling the finger brake.

BACKGROUND ART

A closed face spinning reel of the character considered herein is mounted below a fishing rod at the butt of the handle. A typical reel has a body with an axially movable shaft on which a spinner head is mounted. The shaft is biased rearwardly in the reel body to a line winding position. A finger brake lever actuated by the fisherman moves the shaft and spinner head forward to casting and brake positions. Copending Miller U.S. application Ser. No. 112,912 filed Jan. 17, 1980, shows a reel with a twisted finger brake that projects forwardly adjacent the rod handle for actuation by the fisherman. The twisted finger brake is pivoted to the reel body and is free to move with respect to the body and to the axial shaft. Special guide structure is provided to maintain alignment of the operating leg of the lever with the end of the shaft. The lever is free to move when it is not actuated by the fisherman. The operating handle is not in a uniform or fixed position with respect to the rod and the fisherman cannot reliably grip and operate it. The lever rattles which may be disturbing to the fisherman.

The reel of the present application is directed to overcoming one or more of the problems as set forth above.

DISCLOSURE OF THE INVENTION

In one aspect of the invention, the finger brake is provided with resilient means for urging the lever to a stop position with the operating leg of the lever out of contact with the reel shaft. This minimizes rattling of the lever and locates the finger grip in a uniform position when released. More particularly, the lever has a finger grip portion which is a molded plastic part and includes a flexible element molded integrally therewith which bears against a surface of the reel body to urge the element to the stop position. In addition, a surface of the molded plastic part engages the reel body to define the stop position for the lever.

In another aspect of the invention, the molded plastic part has a slot therein which receives a leg of an element as the lever. The leg has a portion with a dimension greater than the corresponding dimension of the slot and a section adjacent such portion and remote from the end of the leg with a smaller dimension. The plastic cover is molded with the slot therein at a temperature above the ambient where the plastic material is flowable. The leg of the element is inserted into the slot while the plastic material remains warm from the molding operation so that the plastic material expands over the portion of greater dimension and, upon cooling, shrinks to an interference fit or interlock with the leg.

BEST MODE FOR CARRYING OUT THE INVENTION

Figures 1, 1A:
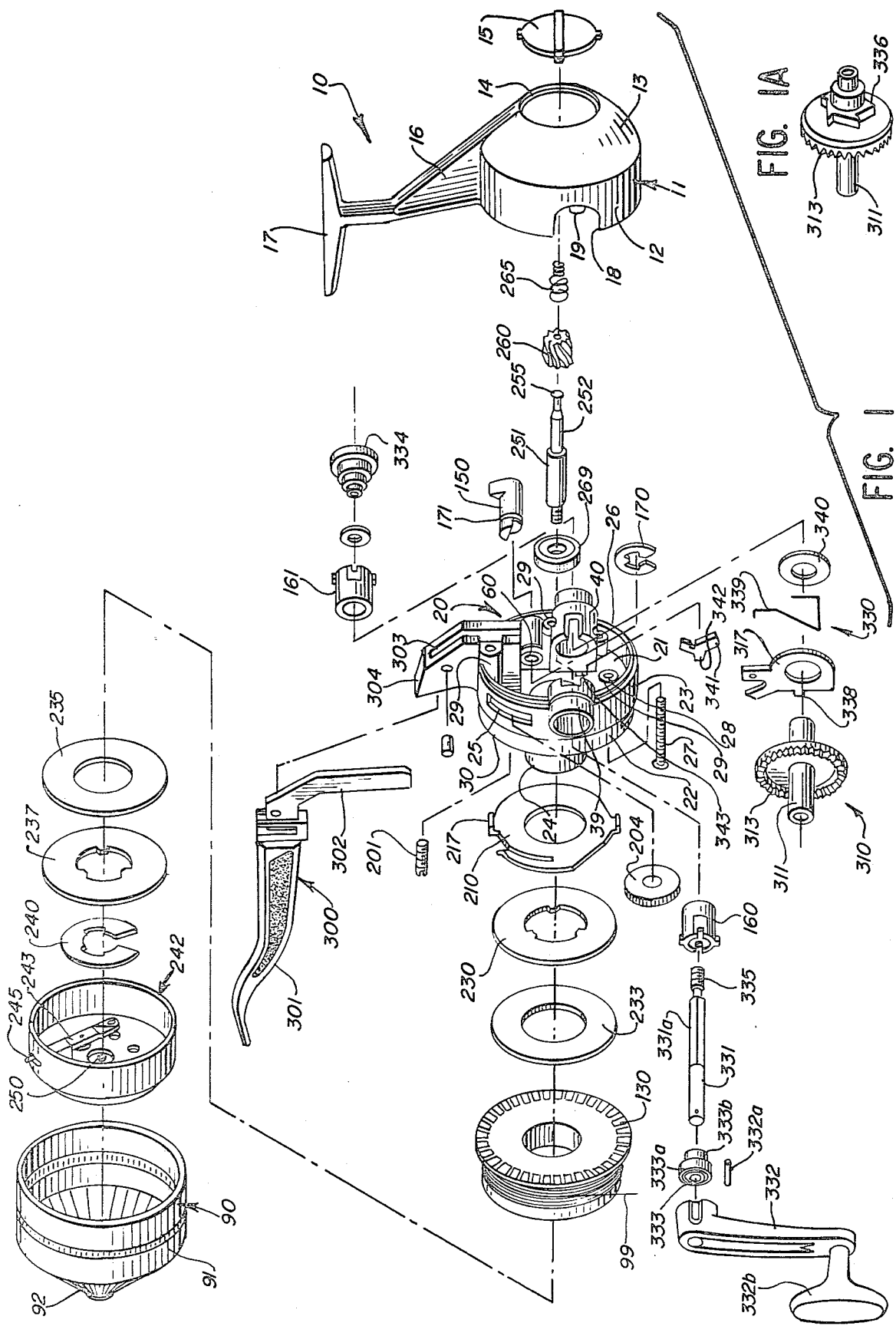
FIG. 1 is an exploded view of a reel embodying the invention.
FIG. 1A is a rear perspective of the gear and ratchet on the crank shaft.

FIG. 1 generally depicts an exploded perspective view of a fishing reel 10 of the spin casting type containing the preferred embodiment of the invention. A back support housing 11, preferably made of an aluminum alloy material, has a cylindrical cover 12, one end of which is open and the other end of which merges into a semispherical rear wall 13 having a center opening 14 in which is seated a back cap 15. A stem 16 is integrally cast with the cylindrical cover 12 and has a mounting foot 17 which is used to attach the reel 10 to a spinning style fishing rod (not shown). A body 20, made of a plastic material, such as a glass filled polycarbonate, has a transverse deck plate 21 with a first or forward circumferential body portion 22 and a second or rearward circumferential body portion 23. A central hub 24 projects forward of the deck plate 21 with a drag plage 210, back spool washer 230, back flat drag washer 233, spool assembly 130, front flat drag washer 235, front spool washer 237, all secured to the hub 24 by means of spool retainer clip 240 which fits into a groove (not shown in FIG. 1) in the distal end of hub 24. The body 20 is secured to the back support housing 11 by inserting an inset flange 26 on the rearward body portion 23 of the body 20 into the one open end of the cylindrical cover 12 of the back support housing 11 and threading screws 27, only one of which is shown in FIG. 1, through apertures 28 in bosses 29 formed through and on the deck plate 21 and into mating bosses (not shown in FIG. 1) in the back support housing 11. A front cover 90, which has a cylindrical body portion 91 and a cone-shaped front portion 92, is secured on an offset portion 30 of the forward body portion 22.

A center shaft 251 is mounted in a center hole (not shown in FIG. 1) in the hub 24 with a spinner head assembly 242 threaded by means of the threaded opening 250 on the forward threaded end of the shaft 251. The spinner head assembly 242 partially surrounds the forward flange of the spool assembly 130 with fishing line 99 being wound thereon. The cone-shaped front portion 92 of the front cover 90 has a front hole (not shown in FIG. 1) which acts as a fishing line guide as the line 99 is cast from the reel 10 and rewound after casting.

A clutch head screw 201 passes through a pilot hole or guide (not shown in FIG. 1) in the deck plate 21 with the slotted head of the screw positioned in the interior of the forward body portion 22 and with a clutch wheel 204 projecting outward of a slot 25 in the rearward body portion 23 threadingly engaging with the body of the clutch head screw 201 where the screw porjects into said rearward body portion 23. A tab 217 on the drag plate 210 fits into the head of screw 201 so that when the clutch wheel 204 is revolved upward toward stem 16, the screw 201 advances forward toward the spool retainer clip 240, increasing the clamping force on the spool assembly 130 so that the ability of the spool assembly 130 to revolve relative to the hub 24 is decreased. When the clutch wheel 204 is revolved away from the stem 16, the clamping force is decreased and the spool assembly 130 is permitted to revolve more freely relative to hub 24, thus providing the adjustable drag mechanism for the fishing reel 10.

The center shaft 251 is slidably and rotatably mounted in a bearing 269 which is mounted in the rear of the hub 24 in the deck plate 21. A pinion gear 260 is splined on a reduced diameter portion 252 of the center shaft 251 and is resiliently maintained in a forward position against the deck plate 21 by a center shaft spring 265. The pinion gear 260 and center shaft 251, being splined together, will have relative axial sliding motion, but rotation of the pinion gear 260 will rotate the center shaft 251. The spring 265 bears against an abutting end 255 on the center shaft 251 to urge the pinion gear 260 against the deck plate 21 and to urge the center shaft 251 in a rearward direction relative to the deck plate 21.

A finger brake lever 300 is mounted on the body 20 with an operating handle 301 exterior of and extending forwardly from the first or forward body portion 22. An operating leg 302 extends through a slot 303 in an upstanding bracket 304 on the body 20 and into the second or rearward body portion 23 for operable contact with the rearward end 255 of the center shaft 251. When the exterior operating handle 301 of the finger brake lever 300 is pulled upward toward the mounting foot 17, operating leg 302 engages the end 255 of the center shaft 251. The center shaft 250 and the spinner head assembly 242 mounted thereon are pushed forward relative to the bearing 269 and the hub 24. A pickup pin mechanism 243, mounted on and within spinner head assembly 242, is, at this point, in retracted position and cooperates with a forward face of a cam (not shown in FIG. 1) carried by the face of the hub 24. When the finger brake lever 300 is fully pivoted toward the mounting foot 17, the spinner head assembly 242 is held in a brake position against the inside of the front cover 90 to trap the line 99 therebetween to prevent casting of the line. Slightly releasing the finger brake lever 300 will maintain the spinner head assembly 242 in a forward casting position, but the spring 265 will retract the center shaft 251 and the spinner head assembly 242 enough to unclamp the fishing line 99 whereby the spinner head assembly 242 will not interfere with the fishing line 99 which can then be cast freely from the reel 10.

A crank assembly 310 is mounted in transversely extending hollow bearing bosses 39 and 40 integrally formed on the wall of the rearward body portion 23. Crank bearing sleeve means 160 and 161 are mounted respectively in the bearing bosses 39 and 40 to provide suitable bearings for a hollow crankshaft 311 of the crank assembly 310. The hollow crankshaft 311 supports an antireverse assembly 330 which will be described in more detail hereinafter.

A crank rod 331 is pivotally connected to a crank handle 332 by means of a pin 332a and the crank rod 331 is slip-fitted into the hollow crankshaft 311 and has flats 331a which mate with flats in the hollow crankshaft 311 to key the crankshaft 311 thereto. A fitting 333 which slides on the crank rod 331 inwardly of the pin 332a has an outer portion 333a that slides easily into one of the bosses 39 or 40 and has an inner portion 333b of smaller diameter which slides easily into the outer end of one of the crank bearing sleeve means 160 or 161. A crank rod nut 334 is secured to a threaded end 335 of the crank rod 331 to fasten said rod 331 to the reel 10. The crank rod 331 can be removed from the side of the reel 10 that it occupies in FIG. 1, and mounted in the opposite side by unfastening the nut 334 in sleeve means 161, removing the crank handle 332 and crank rod 331 from the hollow boss 39, inserting the crank rod 331 in the hollod boss 40, and refastening the nut 334 on the end of the rod in the sleeve means 160. The crank handle 332 has a crank know 332b for gripping by the hand of the user.

Fixed to the hollow crankshaft 311 is a face gear 313 which is in engageable contact with the pinion gear 260 on the shaft 251 so that when the crank handle 332 is rotated in a forward direction (toward the front cover 90 as viewed in FIG. 1), the shaft 251 rotates causing the spinner head assembly 242 to rotate as well. This rotative motion disengages the pickup pin mechanism 243 from the forward face of the cam on the hub 24, causing the spinner head assembly 242 to move rearward as the pickup pin mechanism 243 rides up the cam to extend the pickup pin 245 outwardly beyond the spinner head assembly 242 so that the rotation of the crank handle 332 will rotate the spinner head assembly 242 to wind the fishing line 99 on the spool assembly 130.

Crank assembly 310 is coupled with an antireverse assembly 330, which comprises a ratchet 336, mounted on the crankshaft 311 against the back side of face gear 313 as shown in FIG. 1(a), an antireverse drag arm 337 having a transverse lug 338, a drag spring 339 and spacer washer 340 all mounted on the hollow crankshaft 311. An antireverse pawl 341 having a pivot tang 342 pivotably mounted in an aperture 343 in the deck plate 21, is positioned against the back of the face gear 313 between the deck plate 21 and the transverse lug 338 on the drag arm 337 for engageable and disengageable contact with the ratchet 336.

Antireverse actuator 150 is mounted in upper housing sleeve 60 that opens through the wall of the rearward body portion 23 of body 20 and the actuator 150 is retained in the sleeve 60 by retainer clip 170 seated in slot 171 in the body of the antireverse actuator 150. The antireverse actuator 150 is in cooperative contact, as will be described hereinafter, with the antireverse drag arm 317. In one position, the actuator 150 disengages the antireverse assembly 330 permitting the crank rod 331 and the crank assembly to rotate in either the forward direction (upward toward the stem 16) or the reverse direction (downward from the stem 16 toward the back of the reel 10). In the other position of the actuator 150, the crank assembly can rotate to wind the line 99 on the spool 130.

Figure 2:
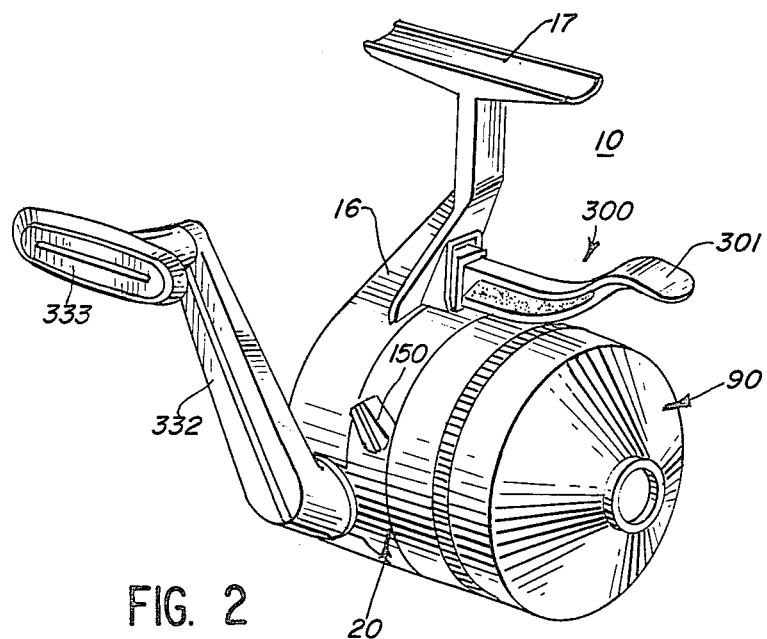
FIG. 2 is a perspective view of the assembled reel.

FIG. 2 shows the reel assembled but with the crank handle 332 extending from the right side of the body 20 rather than from the left as in FIG. 1. The mounting foot 17 is secured to the butt of the handle of a fishing rod (not shown) so that the fisherman may hold the rod and actuate the brake lever 300 by manipulating handle 301 with a finger of the hand which holds the rod.

Figure 3:
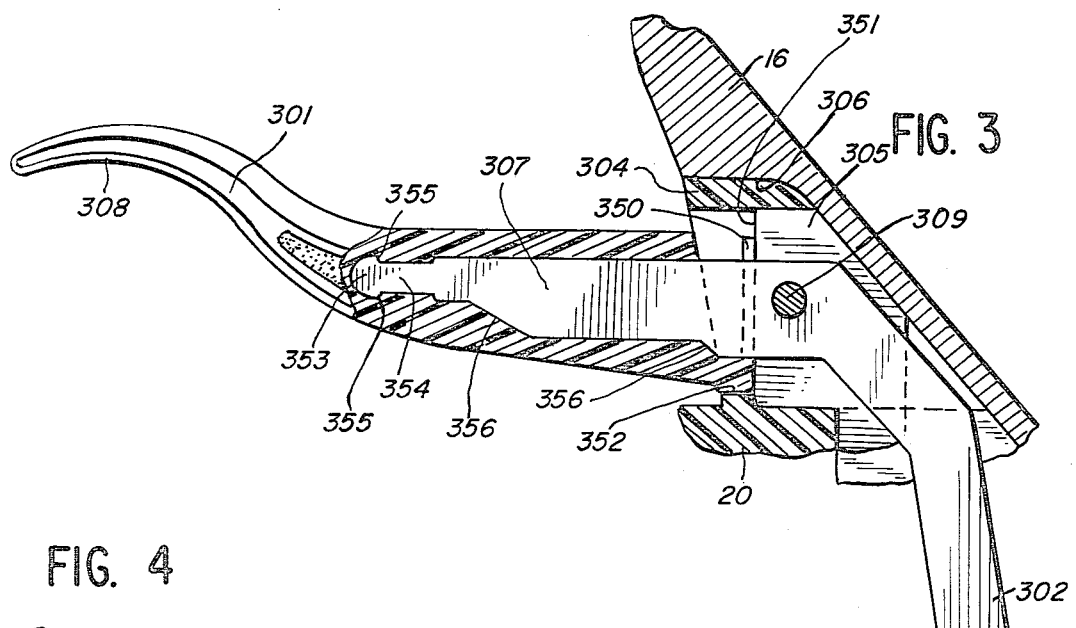
FIG. 3 is an enlarged fragmentary section illustrating the construction and mounting of the brake lever and its engagement with the reel shaft.
Figure 4:
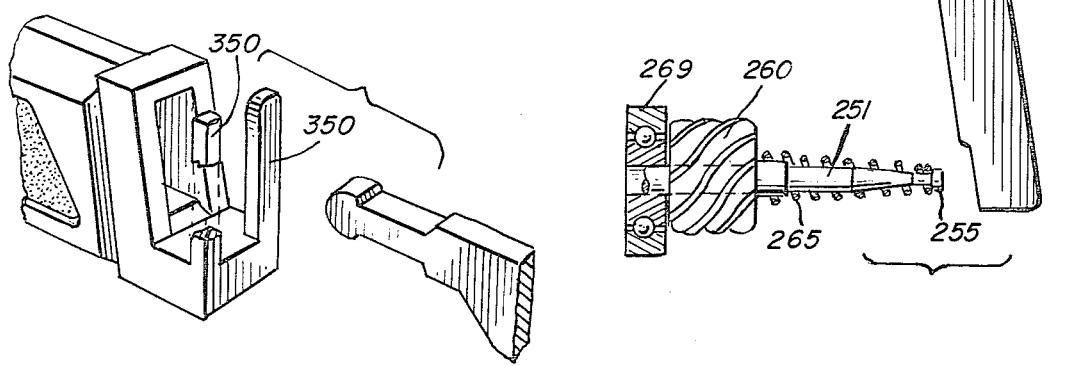
FIG. 4 is a fragmentary perspective view illustrating the position of the parts during assembly of the plastic cover and the leg of the brake lever.

Bracket 304, FIGS. 1 and 3, is integral with reel body 20 and extends outwardly therefrom. The bracket has two laterally spaced apart bracket members, one of which is seen at 305 in FIG. 3. Slot 303 is defined by the facing surfaces of the two bracket members. The bracket is seated in a recess 306 in the forward wall of stem 16.

The brake lever is preferably stamped of sheet metal and has a bellcrank configuration with an operating leg 302 and a leg 307 on which cover or operator handle 301 is mounted, having a finger grip portion 308. The brake lever is pivotally mounted on pin 309 extending between the legs 305 of bracket 304. Operating leg 302 extends into the reel with its end immediately to the rear of the rear end 255 of shaft 251. Leg 307 and handle 301 extend forwardly between the reel body and the handle of the fishing rod.

Handle 301 is preferably molded of the plastic material and has a pair of cantilevered resilient elements 350 formed at its inner end and adjacent pivot pin 309 with the handle assembled with the bellcrank lever. The resilient elements 350 lie on either side of lever leg 307, extending upwardly as seen in FIG. 3. With the bellcrank lever assembled to the reel body, the resilient elements engage the forwardly facing surfaces 351 of the bracket members 305, one of which is seen in FIG. 3. The resilience of the elements 350 urge the brake lever counterclockwise as viewed in FIG. 3 with the end of the leg 302 out of contact with the rear end 255 of shaft 251. The fisherman by lifting handle 301 pivots the bellcrank against the resilient force of elements 350 and brings the end of leg 302 into engagement with the end 255 of shaft 251. Further movement of the brake lever moves the shaft and spinner head 245 forwardly to the casting and brake positions. The thickness of operating leg 302 is preferably equal to or greater than the diameter of shaft end 255. The width of slot 303 is slightly greater than the thickness of the bellcrank to permit pivotal movement without binding but not so great as to allow significant lateral movement or canting of the brake lever. These relationships contribute to reliable engagement of the brake lever with shaft 251.

Handle 301 has a surface 352 which engages reel body 20 to limit counterclockwise movement of the brake lever, defining the stop position of the brake lever. Thus, the finger grip portion 308, when released, has a fixed location with respect to the rod handle so the fisherman may reliably reach for and actuate the brake.

Leg 307 of the bellcrank has a portion 353 at the end thereof which is wider than the adjacent section 354 of the leg, with surfaces 355 which face away from the end of the leg and are interlocked with the cover 301 holding it on the leg. The cover is preferably molded of plastic, as a resin or nylon. A slot is molded in the cover with a dimension seen vertically in FIG. 3 which is slightly smaller than the width of the end portion 353 of the lever leg. When the cover is removed from the forming mold, it is still warm and the plastic is flowable under pressure. The lever leg is immediately inserted and the warm plastic flows around the end portion 353. As the cover cools, the plastic shrinks establishing an interference fit or interlock with surface 355, securely fastening the cover on the lever leg. Surfaces 356 on the leg may abut complimentary facing surfaces in the slot of handle 301 to limit insertion of the leg into the handle.

I claim:
1. In a closed face spinning reel,
a front spinner head,
a body having a deck plate with a center passageway in the deck plate defining a central axis,
a center shaft having a center section mounted for longitudinal movement in the center passageway and having
 a front section projecting forward of the deck plate with means for mounting and securing said spinner head thereto,
 a rear section projecting rearward of the deck plate,
spring means urging the center shaft and spinner head in a rearward direction to a line winding position, and
a brake lever actuable to move said shaft and spinner head forward to casting and brake positions, the improvement comprising:
 a brake lever finger grip portion,
 a brake lever bellcrank portion with two legs, joined with said finger grip portion along one leg of said bellcrank,
 said brake lever finger grip portion is a molded plastic part,
 mounting means in said bellcrank, pivotally mounting the brake lever on said body with the other of said legs of the bellcrank extending into proximity with the rear end of the center shaft and engageable therewith upon pivotal movement of the bellcrank; and
 resilient means for urging said lever to a stop position with the end of said other leg out of contact with said center shaft for minimizing rattling of said lever in the reel and for locating said finger grip in a uniform position after each release of said lever, said resilient means comprises a flexible element molded integrally with said finger grip portion.

2. The spinning reel of claim 1 in which said flexible element bears against a surface of said reel body to urge said lever to the stop position.

3. The spinning reel of claim 1 in which said reel body has an outwardly extending bracket to which said bellcrank portion of the brake lever is pivotally mounted and in which said flexible element bears against a surface of said bracket to urge said lever to the stop position.

4. The spinning reel of claim 3 in which said bracket has a forwardly facing surface against which said flexible element bears.

5. The spinning reel of claim 3 in which the bracket comprises a pair of outwardly extending bracket members on said body defining a slot therebetween with said bellcrank pivotally mounted in said slot, said bracket members each having a forwardly facing surface and said plastic part has a pair of flexible elements one bearing against each of said forwardly facing bracket surfaces to urge said lever to the stop position.

6. In a closed face spinning reel,
a front spinner head,
a body having a deck plate with a center passageway in the deck plate defining a central axis,
a center shaft having a center section mounted for longitudinal movement in the center passageway and having
 a front section projecting forward of the deck plate with means for mounting and securing said spinner head thereto,
 a rear section projecting rearward of the deck plate,
spring means urging the center shaft and spinner head in a rearward direction to a line winding position, and
a brake lever actuable to move said shaft and spinner head forward to casting and brake positions, the improvement comprising:
 a brake lever finger grip portion,
 a brake lever bellcrank portion with two legs, joined with said finger grip portion along one leg of said bellcrank,
 said brake lever finger grip portion is a molded plastic part,
 mounting means in said bellcrank, pivotally mounting the brake lever on said body, with the other of said legs of the bellcrank extending into proximity with the rear end of the center shaft and engageable therewith upon pivotal movement of the bellcrank; and resilient means of urging said lever to a stop position with the end of said other leg out of contact with said center shaft for minimizing rattling of said lever in the reel and for locating said finger grip in a uniform position after each release of said lever, said resilient means comprises a flexible element molded integrally with said finger grip portion and bearing against a surface of said reel body to urge said lever to the stop position, and said molded plastic part has a surface which engages said reel body to define the lever stop position.

7. In a closed face spinning reel, a front spinner head, a body having a deck plate with a center passageway in the deck plate defining a central axis, a center shaft having a center section mounted for longitudinal movement in the center passageway and having a front section projecting forward of the deck plate with means for mounting and securing said spinner head thereto, a rear section projecting rearward of the deck plate, spring means urging the center shaft and spinner head in a rearward direction to a line winding position, and a brake lever actuable to move said shaft and spinner head forward to casting and brake positions, the improvement comprising:

a brake lever finger grip portion, a brake lever bellcrank portion with two legs, joined with said finger grip portion along one leg of said bellcrank, said brake lever finger grip portion is a molded plastic part, mounting means in said bellcrank, pivotally mounting the brake lever on said body, with the other of said legs of the bellcrank extending into proximity with the rear end of the center shaft and engageable therewith upon pivotal movement of the bellcrank, said reel body has a peripheral surface with a pair of spaced apart bracket members extending outwardly therefrom and defining a slot therebetween which receives said bellcrank, the bracket members having forwardly facing surfaces, a pivot pin extends between said bracket members to mount said bellcrank for pivotal movement, and resilient means for urging said lever to a stop position with the end of said other leg out of contact with said center shaft for minimizing rattling of said lever in the reel and for locating said finger grip in a uniform position after each release of said lever, said resilient means comprises a pair of flexible elements molded integrally therewith and bearing against said forwardly facing bracket surfaces to urge said lever to the stop position, and said molded plastic part has a surface which bears against a surface of said body to define the stop position.

8. In a closed face spinning reel as claimed in claim 1 wherein the bellcrank portion is made of metal and has the molded plastic part of the finger grip portion interlocked with a surface of said one leg of said bellcrank portion to hold the plastic part on the leg.

9. The spinning reel brake lever of claim 8 in which said plastic part is molded with an axial slot to receive the one leg of said metal bellcrank portion, the slot and the leg having complementary facing surfaces which abut upon insertion of the leg to limit the depth of insertion of the leg into the plastic part.

10. The spinning reel brake lever of claim 8 wherein the one leg of the bellcrank is of sheet metal of uniform thickness and has an end received in the plastic part with a pair of surfaces adjacent said end and facing away therefrom which are interlocked with the plastic of said plastic part to hold the plastic part on the one leg of the bellcrank.

* * * * *